Dec. 31, 1935.  W. J. BURGOYNE ET AL  2,025,799
APPARATUS FOR ROASTING FINES
Filed Feb. 19, 1930   2 Sheets-Sheet 1
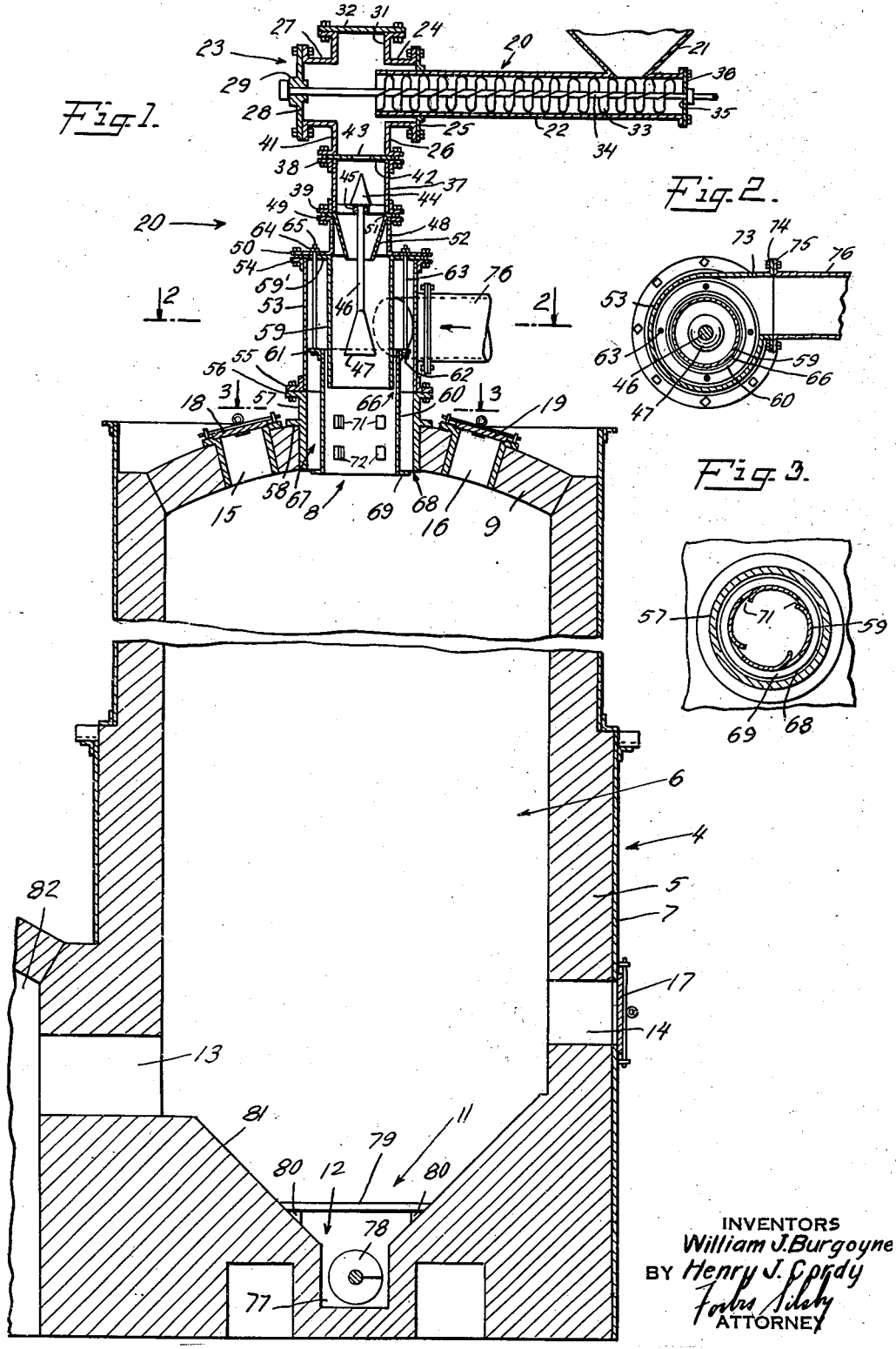
INVENTORS
William J. Burgoyne
BY Henry J. Cordy
ATTORNEY Dec. 31, 1935.    W. J. BURGOYNE ET AL    2,025,799
APPARATUS FOR ROASTING FINES
Filed Feb. 19, 1930    2 Sheets-Sheet 2
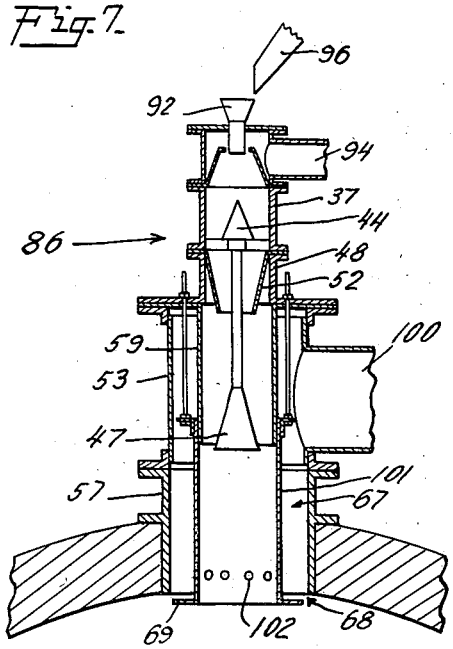
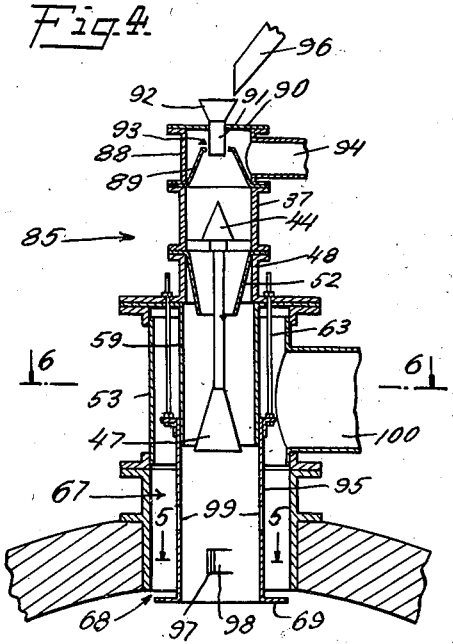
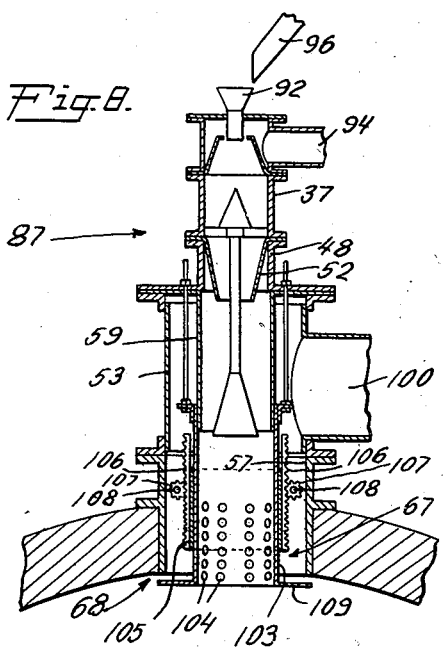
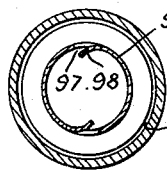
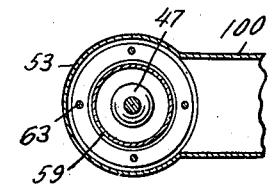
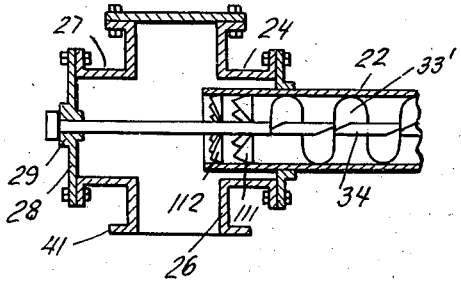
INVENTORS
William J. Burgoyne
BY Henry J. Cordy
ATTORNEY Patented Dec. 31, 1935

2,025,799

UNITED STATES PATENT OFFICE 2,025,799

APPARATUS FOR ROASTING FINES

William John Burgoyne and Henry John Cordy, Sulphide, Ontario, Canada, assignors to General Chemical Company, New York, N. Y., a corporation of New York Application February 19, 1930, Serial No. 429,691

32 Claims. (Cl. 266—28)

This application is a continuation in part of our co-pending application, Serial No. 250,616, filed January 30, 1928.

Our invention relates to a method and apparatus for the roasting of finely divided sulfide ores, flotation concentrates and the like, and more particularly to apparatus for roasting finely divided pyrites ores or flotation concentrates, to thoroughly desulfurize the same and to produce sulfur dioxide for use in the manufacture of sulfuric acid.

The present practice in pyrites fines roasting generally involves the use of mechanically operated multiple hearth constructions, such, for example, as the well known MacDougall, Herreshoff, and Wedge burners, and while these burners provide a very effective roasting of the fines, their complicated construction and operation involve considerable initial and maintenance expense.

As distinguished from the "bed" roasting operation of these burners, it has been suggested to roast the fines while in gaseous suspension, wherein the fines are either injected into a roasting chamber in suspension in the oxidizing gas, or are simply showered downwardly into the roasting chamber wherein they encounter cross or countercurrents of the suspending gas.

This suspension roasting is best applicable when the fines are in a very finely divided state, e. g. as flotation concentrates, and it presents the notable advantage over the mechanical multiple hearth operation of considerably lowering the cost of production, by reason of the elimination of the involved and expensive rabbling and other apparatus which distinguishes the construction and operation of the mechanical burners. In the practice of this suspension roasting, however, and particularly as applied to roasting pyritic fines, difficulties of some moment are presented which must be overcome before the obvious theroretical advantages of this type of operation are practically available.

The most serious and perplexing difficulty encountered in the suspension roasting of pyrites fines is the objectionable formation of accretions of "scar" on the walls of the roasting chamber during the roasting operation. These scar masses assume imposing proportions with disconcerting rapidity, and in a relatively short time, masses weighing several hundred pounds are commonly formed. Unless these masses are removed, obstruction of the roasting passage will result and the operation will be otherwise seriously hindered. The scar masses may be manually broken away, or "barred" down from the walls periodically, but the frequency with which this operation must be repeated to keep the scar formation within reasonable limits results in inordinate interruption of the operation and, in addition, the wear and tear on the apparatus occasioned by the heavily falling masses raises even more serious objection to this manner of removal. Moreover, the problem of incomplete desulphurization is not solved thereby for the considerable amounts of undesulphurized material which are confined within the accretions pass off in the cinder substantially unaffected.

We have investigated the scarring problem noted and, while the exact reason for its occurrence is rather difficult to determine, it would seem to be more or less ascribable to the very pronounced tendency which the iron pyrites exhibits to sinter at a particular stage of its desulphurization, at which stage it readily adheres to the confines of the roasting chamber and builds up accretions thereon. Investigation of a typical iron-pyrites ore in this relation appeared to indicate that at a point in its transition from $FeS_2$ to $Fe_2O_3$ which would roughly correspond to the oxidation of one atom of the sulphur in the $FeS_2$, the partially desulphurized material sinters much more readily than at prior or subsequent stages in the desulphurization. This may be explained either on the basis that FeS is the major form existing at this particular stage and that the FeS per se sinters much more readily than any of the other transition or final products, or possibly that there is a formation of a eutectic of FeS and $Fe_2O_3$.

Regardless of the exact reasons for this behavior, however, the results of our determinations have clearly indicated that the solution of this problem rests in so controlling the operation that the pyrites being roasted will not be permitted to contact with the walls of the reaction chamber while it is in the transitory sticky condition noted.

We have experimented with various methods of roasting the pyrites fines in suspension, in an endeavor to find a means of overcoming the effect of this transitory sintering condition, and have found that by injecting a quantity of the oxidizing gas adjacent the walls of the roasting chamber in the upper part thereof, that scarring of the chamber walls is eliminated, very thorough desulphurization of the fines is obtained, and concentrations of sulfur dioxide are obtainable which are very suitable for use in the manufacture of sulphuric acid. This action appears to be due to the interposition of a supplemental portion or blanket of the oxidizing gas between the walls of the roasting chamber and the main suspension of the burning pyrites when the latter is in the state conducive to scar formation.

The present invention relates to apparatus suitable for carrying out our improved method for roasting sulfide fines claimed in our copending application previously mentioned and also to a modified method for roasting sulfide fines. In the accompanying drawings Figure 1 is a sectional elevation of a preferred form of pyrites burner embodying the present invention;

Figure 2 is a plan view of a portion of the feeding mechanism for the same taken along the line 2—2, Figure 1;

Figure 3 is a plan view of another portion of the feeding mechanism taken along the line 3—3, Figure 1;

Figure 4 is a sectional elevation of a modified form of feed mechanism;

Figure 5 is a horizontal section on the line 5—5 of Figure 4;

Figure 6 is a horizontal section on the line 6—6 of Figure 4;

Figure 7 is a sectional elevation of a modified form of feed mechanism;

Figure 8 is a sectional elevation of another modified form of feed mechanism, and Figure 9 is a vertical section of a modified form of feed conveyor mechanism.

Referring to the drawings, and in particular to Fig. 1, reference numeral 4 indicates a shaft burner comprising a shell 5, constructed of a suitable refractory material such as fire brick or the like, which defines a roasting or reaction chamber 6 of cylindrical shape throughout the major portion of its length. A casing 7 of steel or similar material is provided about the sides of the shell 5 to suitably reinforce the same. Chamber 6 is provided with a feed inlet 8 in the center of the burner crown 9; a trough-like cinder pit 11, constituting the bottom of the chamber, which extends diametrically thereacross and is open at the base throughout its length to provide an elongated cinder outlet 12; and a lateral gas outlet 13 in the wall of the chamber just above the cinder pit 11. Suitably constructed work holes 14, 15 and 16 covered by detachable external closures 17, 18 and 19 are also provided to afford access to the interior of the roasting chamber.

Terminating in the feed inlet 8 is a feed mechanism 20 for introducing the fines and oxidizing gas into the roasting chamber. This feed mechanism is constructed as follows: A charging hopper 21, into which the finely divided material to be roasted is introduced in any suitable manner, is mounted above and terminates in a tubular charging conduit 22, which conduit discharges into a cross indicated generally at 23. This cross comprises a lateral arm 24 to which is bolted a cap 25 provided with a suitable bore for the accommodation of conduit 22; a downwardly extending arm 26 above which the discharging end of the conduit 22 terminates; a lateral arm 27 to which is bolted a cap 28 having a bearing 29; and an upwardly extending arm 31 having a cap 32 detachably secured thereto in any well-known manner whereby access may be readily had to the interior of the cross. Within the conduit 22 is a helicoid conveyor 33 whose shaft 34 is mounted for rotation in bearing 29 in cap 28 and bearing 35 provided in a plate 36 closing one end of the conduit 22.

A cylindrical coupling 37 having top and bottom flanges 38 and 39 respectively is secured at its top flange 38 to the flanged bottom 41 of the arm 26 of cross 23, and retained intermediate the joined flanges 38 and 41 is a baffle plate 42 which extends completely across the passage provided by coupling 37. Baffle plate 42 is provided with a central orifice 43, and below and in alignment with said orifice is a distributing cone 44 supported by a cross beam 45 which extends diametrically across and is bolted or otherwise secured to the coupling 37 in any well-known manner. A rod 46 depends from the cone 44, extending through a bore provided therefor in the cross beam 45, and this rod terminates at its lower end in a larger distributing cone 47.

Another cylindrical coupling 48 having top and bottom flanges 49 and 50 respectively is bolted to coupling 37 through the medium of the flanges 49 and 39, and gripped intermediate the joined flanges is the flanged top 51 of a funnel 52.

A cylindrical member 53, having top and bottom flanges 54 and 55 respectively, is bolted to coupling 48 through the medium of the flanges 54 and 50, and has its bottom flanges 55 mounted upon and bolted to the top flange 56 of a sleeve 57 forming, with cylindrical member 53, a cylindrical casing which is set snugly into the feed inlet 8 and is supported therein by means of a circumferential projection 58 which abuts against the surface of the crown 9.

A terminal cylinder 59 is suspended by means of its top flange 59' gripped between the joined flanges 54 and 50, and terminates at a point below the base of the distributing cone 47, said cylinder forming with a sleeve 60 and the vertical passage provided by the super-jacent couplings 48, 37 and the arm 26 of cross 23, a sectional ore inlet conduit.

The cylindrical gas-distributing sleeve 60, having a top flange 61 is carried on the headed ends 62 of a number of suspension rods 63 extending through said flange, at least four of said rods spaced equi-distantly around the flange 61 being ordinarily desirable. These rods extend through suitable bores provided in flanges 59' and 50 and are retained on the latter by means of adjustable nuts 64 on their threaded ends 65, whereby the sleeve 60 may be adjusted vertically with respect to the cylinder 59 and the inlet sleeve 57. The sleeve 60 extends around the lower portion of the cylinder 59 in uniform radially spaced relation thereto whereby a narrow annular gas passage 66 is provided between the cylinder and the sleeve, and the clearance thereby presented will permit the sleeve to be readily adjusted vertically of the cylinder. The sleeve 60 is also positioned in uniform radially spaced relation to a portion of the casing 53 and the inlet sleeve 57, which members surround sleeve 60, and an additional annular gas inlet chamber 67 is thereby provided between the sleeve 60 and these surrounding members. The annular mouth or passage 68 of this latter inlet chamber 67 is defined by the rim of the flange or deflecting member 69 of sleeve 60 and the adjoining inner surface of the inlet sleeve 57, and by suitable vertical adjustment of the sleeve 60 by means of the suspension rods 63 the size of the mouth or passage 68 may be varied as desired, whereby a greater or less amount of oxidizing gas may be admitted therethrough into the roasting chamber from the inlet chamber 67.

As shown in Figs. 1 and 3, a series of suitably spaced apertures 71 for admission of the oxidizing gas is punched inwardly in the wall of the sleeve 60 at points therein below the bottom of cylinder 59, all of which apertures give access to the interior of the ore inlet conduit in substantially the same general direction as regards the circumference of the sleeve 60. Spaced lower down in the wall of the sleeve is another series of similar inwardly punched apertures 72 which give access to the interior of the sleeve in a direction substantially opposite to that of the upper series. A tangential extension 73 (Fig. 2) projects from the casing 53, and to the flanged end 74 of said extension is bolted the flanged end 75 of a pipe 76 leading from a suitable fan blower (not shown), whereby the oxidizing gas may be blown into the feed mechanism.

Beneath the cinder outlet 12 and extending in diametrical alignment therewith is a discharge conduit 77 in which is mounted in any suitable fashion a helicoid conveyor 78 for continuously removing the cinder from the burner. A grate 79 is mounted above the cinder outlet 12 leading into the discharge conduit, which grate may be supported at its sides by lugs 80 on the inclined walls 81 of the trough-like cinder pit 11, or in any other suitable fashion. By means of the grate 79 pieces of cinder too large to be conveniently handled by the conveyor may be periodically broken up by a workman to permit their passage through the grate. Access to the grate for the operation noted is afforded by the work hole 14.

The gas outlet 13 leads to a dust chamber 82 of any well-known type, part of which is shown in Fig. 1, wherein the gases are separated from the entrained dust prior to their utilization in the manufacture of sulphuric acid. In view of the fact that it is desirable to maintain a substantially neutral, (i. e., atmospheric) or a slightly positive pressure above the cinder outlet 12 as noted in detail hereinafter, provision must be made for drawing the dust-laden gases through the dust chambers, and this may be accomplished by maintaining a suitably reduced pressure at the outlet for the dust-free gases from the dust chambers (not shown), by any well-known means such as a fan blower.

The modified form of feed mechanism, 85, 86 and 87, of Figs. 4 to 8 inclusive, are in many respects similar to feed mechanism 20. Structural elements of the modified forms which are the same or substantially the same as the corresponding parts already described in connection with Fig. 1 are indicated by like reference characters.

Referring to Fig. 4, a cylindrical coupling 88, flanged on both ends, is bolted or otherwise attached to the upper flange of the coupling 37. The lower flange of the semi-cone shaped member 89 is interposed and clamped between the adjacent flanges of couplings 37 and 88 and thus supported in the position shown. Attached to the upper end of the coupling 88 is a cap 90 through which passes an ore inlet pipe 91 having on its upper end a funnel-shaped hopper 92. The inlet pipe 91 is of such length as to project an appreciable distance below the upper flange of the member 89. The opening in the upper end of the member 89 is of such diameter as to form an annular gas passage 93 between the inner edge of the flange and the outer surface of the lower end of the inlet pipe 91. The primary gas feed pipe 94 is suitably connected to the coupling 88 in such manner that the axis of pipe 94 intersects the vertical axis of the coupling 88 and the subjacent ore inlet conduit formed by couplings 37, 48, terminal cylinder 59 and the distributing sleeve 95. A chute, suitably supported by means not shown for feeding ore into the hopper 92 is indicated at 96.

In some instances it may be desired to replace the chute 96 with a screw conveyor such as shown in Figs. 1 or 9. If such a change is desired, the lower flange 41 of cross 23, Fig. 1, may be placed directly over the cap 90, Fig. 4, and bolted to the upper flange of the coupling 88. In this instance, the end of the conduit 22 is positioned over the hopper 92, and the ore is thus fed into the inlet pipe 91.

The gas distributing sleeve 95 is supported and may be adjusted vertically by the rods 63 in the manner already described in connection with Fig. 1. The sleeve 95 is of such diameter as to have a sliding fit over the lower end of the terminal cylinder 59, which construction permits a more rigid and accurate regulation of the flange 69.

As shown in Figs. 4 and 5, the walls of the sleeve 95 are punched inwardly to provide suitably spaced apertures at points below the end of the cylinder 59 and near the lower end of the sleeve 95. The openings 97 afford air inlets to the interior of the sleeve 95, and the inwardly-bent portions 98 serve to give the entering air a whirling motion within the sleeve. A second series of apertures 99 is spaced upwardly from the apertures 97. The inwardly-bent portions of the wall material are directed oppositely to those of the lower series and thus effect a whirling of the incoming air or other oxidizing gas in the opposite direction.

The gas inlet chamber 67 is in communication with the secondary gas inlet pipe 100 which is connected to the cylindrical member 53 in such manner that the axis of pipe 100 intersects the vertical axis of the feed mechanism as a whole. This radial connection between pipe 100 and the cylindrical member 53 is shown in horizontal section in Fig. 6.

The feed mechanism illustrated in Fig. 7 differs from that described in connection with Fig. 4 in that the distributing sleeve 101 is provided with a single series of circular openings 102 near the lower end of the sleeve. In this instance the gas admitted from the inlet chamber 67 is introduced radially into the ore conduit.

In the modifications shown in Figs. 1, 4 and 7 the outside diameter of flanges 69 is slightly less than the inner diameter of sleeve 57. This construction permits the insertion and withdrawal of the gas distributing sleeve without removal of the sleeve 57 from the crown of the burner. This construction also facilitates an adjustment of the annular mouth 68 so that the form of the air blanket issuing therefrom will more nearly approach that of a cylinder, so that the air blanket first impinges on the vertical walls of the burner some distance below the top.

In the modification of Fig. 8, the construction is essentially the same as in the form illustrated in Fig. 7. However, the gas distributing sleeve 103 is provided at its lower end with a plurality of series of circular openings 104, any number of which may be put in communication with the gas inlet chamber 67 by proper adjustment of the cylindrical sleeve 105 slidably mounted on the outside of the sleeve 103. The sleeve 105 may be adjusted vertically by means of the racks 106 fixed to the sleeve 105 and the co-operating pinions 107 keyed to the cross shafts 108. The shafts 108 pass through the wall of the sleeve 57 and are journalled in bearings suitably attached to and supported by the sleeve 57. The pinions 107 may be operated by means of separate handles keyed to the ends of shafts 108, or the rotation of the pinions 107 in opposite directions at the same rate may be effected by a handle attached to the end of one shaft, and pinions mounted on both shafts meshing with a pair of interposed idlers, the pinions and idlers obviously being outside the sleeves 57. The adjustable sleeve 105 thus permits accurate regulation of the quantity of air entering the ore inlet conduit from the gas inlet chamber 67.

The flange 109 is of a diameter greater than the interior diameter of the sleeve 57. This construction facilitates adjustment of the sleeve 103 so that the air entering the roasting chamber from the annular mouth may be directed along the roof of the burner crown.

A further advantage of this construction is that the air blanket may be more accurately adjusted, and the quantity of air in the blanket reduced to a minimum. This makes available more air for mixture with the ore in the main inlet conduit giving a more uniform mixture of suspended ore in the air and a resulting more rapid and complete combustion in the furnace.

The gas distributing sleeve may be made of any suitable material such as wrought iron or cast iron. The latter is preferred, however, as it may be advantageously machined and accurately shaped.

In Fig. 9 is illustrated a modified form of ore feed mechanism which has proved highly satisfactory for furnaces for suspension roasting. In this modification, a part of the conveyor spiral immediately adjacent the discharge end of the conduit 22 is replaced by the two blade propellers 111 and 112 keyed to shaft 34. The propellers are formed from disks radially slotted, with the adjacent sectors bent to effect the proper pitch. Propeller 111 may be provided with say six blades, and propeller 112 with some greater number of blades, say twelve for example. As the spiral 33' pushes the ore forward in intermittent fashion, propeller 111 divides each of the small piles of finely divided ore delivered by the spiral 33' into six portions, and passes them on to the twelve bladed propeller 112 which picks up the ore thus delivered and advances it into the main conduit of the feed nozzle in an almost continuous manner. This arrangement eliminates the pulsating feed of ore which is effected by the continuous spiral 33 of Fig. 1, and thus effects more regular combustion and desulfurization in the furnace proper.

The operation of the invention is substantially as follows: The furnace is first strongly preheated, for example by means of one or more oil burners inserted through the work hole 14, until a temperature is obtained in the chamber 6 substantially above the ignition point of the iron pyrites, for example, about 850° C. During the preheating operation work holes 15 and 16 are uncovered to provide flues for the escape of the products of combustion.

Finely divided iron pyrites, which has been dried until the moisture is not greater than 0.3% and preferably between .1% and .2%, and of a particle size such that 100% will pass a 60 mesh (to the inch) screen, is then fed into the hopper 21, in any suitable manner. From the hopper the fines are substantially continuously supplied to the helicoid conveyor 33 within the charge conduit 22, by means of which they are delivered into the passage in the arm 26 of cross 23. Some of the pyrites fines will pass directly through the orifice 43 in the baffle plate 42, and the remainder will pile up around the orifice until a funnel-like mass of fines is formed with the orifice 43 as its mouth, which mass will aid in directing subsequent portions of fines to the orifice and onto the distributing cone 44. Passing over the cone 44, the fines will be directed onto the sides of the funnel 52, and thence will proceed into the terminal cylinder 59, at the lower portion of which they will be spread out by the distributing cone 47 into a somewhat cylindrical-shaped sheet, in which form they will reach the gas distributing sleeve 60.

Air or oxygen may be used as the oxidizing gas, preferably the former, and either at atmospheric temperature, or preheated to any desired degree thereabove which is below the ignition point of the pyrites, is blown through the pipe 76 and tangentially into the space between the cylindrical member 53 and the cylinder 59 (Figures 1 and 2). The amount of air introduced will depend upon the amount of sulfur in the fines to be desulphurized, the concentration of $SO_2$ desired in the exit gases, and other factors evident to one skilled in the art, and the regulation of the air supply may be accomplished in any suitable and well-known manner. In practice, determination of the $SO_2$ content of the exit gases and the character of the cinder will usually indicate the necessary regulation of the air supply to provide the desired results, the fines being supplied at a substantially regular rate. The pressure under which the air is introduced should be so regulated that a positive pressure very closely approaching atmospheric is obtained over the cinder outlet, a slight plus pressure of about .02" to .03" being suitable under most circumstances.

Upon introduction into the feed mechanism the air will whirl around the cylinder 59, and traveling downwardly, a major portion of the same will pass into the interior of the air distributing sleeve 60 through the passage 66 and the apertures 71 and 72 leading off inlet chamber 67, and the remainder will sweep directly into the roasting chamber 6 through the mouth 68 of inlet chamber 67. The distributing sleeve 60 should be so adjusted by means of its suspension rods 63 that the size of the mouth or annular passage 68 is such that only sufficient air is admitted therethrough to prevent scar formation on the walls of the roasting chamber. This can be determined by varying the size of the mouth and observing the effect upon the chamber walls through one of the work holes 15 or 16. The amount of scar inhibiting air necessary is usually a minor proportion of the total amount of air admitted, and ranges generally from 5% to 10% of the quantity of air necessary for combustion in the furnace. The sheet of pyrites fines showering out of the terminal cylinder 59 will be swept up in the turbulent air pouring into the sleeve 60 and the substantial suspension of the intimately mixed air and fines obtained thereby, will pass on into the hot roasting chamber 6. Upon entering the preheated chamber the suspension of fines and air will be ignited and oxidation will thereafter proceed at a very rapid rate.

The oxidation of the iron pyrites is a strongly exothermic reaction, to the extent that it is substantially self-sustaining, and other than the necessity of initiating the reaction, for example, by preheating the furnace to a suitable temperature above the ignition point of the pyrites, no auxiliary heat is required. In operation the temperature will be quite high throughout the chamber 6; in the production of an approximately 10% $SO_2$ gas, from a typical iron pyrites ore, for example, the temperature in the roasting chamber was in the neighborhood of 1000° C.

Upon the entry of the turbulent gaseous suspension into the enlarged space presented by the roasting chamber, expansion of the suspension takes place, and this expansion is enhanced by the large amount of heat supplied by the combustion of the fines in addition to that emanating from the heated walls of the roasting chamber. This expansion tends to cause an appreciable proportion of the suspended particles to be thrown toward the chamber walls, and such particles as are in the transitory sticky condition hereinbefore discussed would under ordinary circumstances tend to adhere to the walls upon contacting therewith and rapidly build up accretions thereon.

The portion of air, however, which enters the roasting chamber through the annular mouth 68, simultaneously with the introduction of the main body of the suspension from the sleeve 60 serves to inhibit throughout the operation the usually inescapable scar formation.

In the case of the feed mechanisms shown in Figs. 4 to 8, the finely divided ore is fed into the hopper 92 in a constant stream from the chute 96. Air or other oxidizing gas is introduced into the interior of the coupling 88 through the primary inlet pipe 94, under a pressure sufficient on passing through annular orifice 93 to induce an injector action which serves to draw in and assist with the dispersion of the ore in the vertical ore inlet conduit and also prevents the escape of air or gases through the feed pipe 91. The quantity of primary air introduced through pipe 94 varies from about 5% to 15% of the total amount of air introduced into the furnace. About 85% to 95% of the total volume of air necessary for combustion in the roasting chamber enters the cylindrical member 53 and the inlet chamber 67 through the secondary inlet pipe 100. Radial introduction of air into chamber 67 is preferable because a better mixture of ore and air and more complete combustion are obtained. The major portion of the air in chamber 67 will pass into the interior of the sleeves 95, 101 and 103 through the slots 97 and 99 of Fig. 4, and the circular openings 102 and 104 of Figs. 7 and 8. In the form shown in Fig. 4, the mixing action is in some degree similar to that which takes place in the apparatus of Fig. 1, with the probable difference that the turbulent mixing action is a little more violent, thus tending to break up any individual spiral streams of finely divided ore which may form. The difference may be on account of the fact that substantially all the air entering the sleeve 95 from chamber 67 is admitted through the slots 97 and 99, as the passage between the lower end of sleeve 59 and the upper end of sleeve 95 is practically stopped off because of the sliding fit between these members.

As previously mentioned, when working under some conditions, best results may be obtained by the use of the sleeves 101 and 103 having the circular openings 102 and 104. As the air in these instances enters the interior of the sleeves more or less radially rather than tangentially, the mixing of the finely divided ore and air is in some degree differently effected, and in some circumstances for reasons not altogether apparent, better combustion in the roasting chamber and less scarring on the walls takes place.

Where the screw conveyor feed mechanisms of Figs. 1 and 9 are used in conjunction with the modified forms of feed nozzles, the mixing action of the ore and air in the vertical ore inlet conduit is essentially the same as already described.

The initial stages of the roasting operation are the most intense and normally take place in the upper part of the roasting chamber. It is in this upper part of the chamber that the tendency toward scar formation appears to be most marked, and it seems probable that as the proportion of the $Fe_2O_3$ increases, the tendency toward scarring decreases. On that basis it would seem that the provision of the air blanket between the walls of the chamber and the burning suspension need only be confined to the upper part of the chamber in order to prevent scar formation, and it may be that such is the case in the operation of the present method as noted, although the particular path of the air blanket is more difficult to trace the greater its penetration into the furnace. On the other hand it is quite possible that the gaseous suspension of fines could be introduced under such pressure, for example, that the scar forming stage would occur at a point considerably lower down in the roasting chamber, in which event it would be necessary to run the air blanket substantially throughout the length of the chamber.

In view of these considerations it is essential primarily that the air blanket be interposed between the walls of the chamber and the burning pyrites while the latter is in a state conducive to scar formation, regardless of its relative location in the roasting chamber while in that state. That such is the case in the operation of our method is evidenced by the fact that by suitably varying vertically the position of the flanges 69 and 106, and thereby the volume and direction of the air blanket admitted through the mouth 68 and the form and extent of the cone of dispersion of the air blanket, the formation of scar under such variations of the roasting operation as are involved in ordinary industrial practice can be eliminated.

Whether the scar inhibiting action of the air blanket is due to an oxidizing effect, whereby the particles in the sticky stage are oxidized past that stage prior to contacting with the chamber walls, or to a physical effect involving entrainment of the particles, whereby they are prevented from contacting with the walls, or to a combination of both effects, is practically indeterminate and not particularly material. Regardless of the exact explanation it is certain that this auxiliary portion of the oxidizing gas is interposed in the upper portion of the furnace between the walls of the chamber and the burning fines while they are in a state conducive to the formation of scar on the walls.

The length of the roasting chamber and the speed of introduction and travel of the fines and air should be such that a thorough desulphurization is obtained in the passage through the roasting chamber, as is obvious to one skilled in the art.

By conducting the operation in accordance with the foregoing principles, the fines in suspension are quite thoroughly desulphurized by the time the cinder and gas outlets are reached, and by regulation of the pressure as hereinbefore noted, the major portion of the desulfurized particles, mainly in the form of iron oxide collects in the cinder pit 11 whence it is conducted away by the helicoid conveyor 78. The gases containing the SO₂ passing into the dust chambers 82 carry entrained therein an appreciable portion of the finest particles, i. e., dust, which dust, consisting mainly of iron oxide is collected in the dust chambers, and the dust-free gases containing the SO₂ are drawn from the chamber and conducted away for utilization in the production of sulphuric acid.

The roasting of pyritic fines in suspension according to our invention provides an operation which, in practice, presents numerous advantages over the various methods of burning such fines heretofore suggested.

Its most important accomplishment is the removal of the obstacle to efficient practical operation presented by the formation of the objectionable scar. The sulfide fines are, moreover, very thoroughly desulphurized, a very desirable feature from an efficiency standpoint; this very thorough desulphurization being also ascribable in the main to the elimination of the scar formation which serves to prevent thorough desulphurization of the pyrites fines.

In addition, the operation requires but a slight amount of attention, and the initial and maintenance expense involved are such as to permit production at a very low cost.

While we have specifically noted the application of our invention to the roasting of finely divided iron pyrites ore or flotation concentrate, it is obvious that our invention is not confined to the use of that particular material but is applicable generally to other sulfide ores where the undesirable formation of similar scar is involved. Copper pyrites ore and flotation concentrates of the same are characterized by a similar action, and the same is also true of pyrrhotite although to a less marked degree.

We claim:

1. Apparatus of the character described comprising in combination a reaction chamber, an inlet at the upper end of the reaction chamber, means for forming a suspension of finely divided material in an oxidizing gas, means for introducing the suspension into the reaction chamber through the inlet, and means for maintaining a fluid protective layer between the walls of the reaction chamber and the gaseous suspension therein.

2. Apparatus of the character described comprising in combination a reaction chamber, an inlet at the upper end of the reaction chamber, means for forming a suspension of finely divided material in an oxidizing gas, means for introducing the suspension into the reaction chamber through the inlet, and means for maintaining a layer of gas between the walls of the reaction chamber and the gaseous suspension therein.

3. Apparatus of the character described comprising in combination a reaction chamber, an inlet for the reaction chamber, means for forming a suspension of finely divided material in an oxidizing gas, means for introducing the gaseous suspension into the reaction chamber through the inlet, means for introducing a fluid medium into the reaction chamber through the inlet, and means for maintaining a layer of the fluid medium between the walls of the reaction chamber and the gaseous suspension therein.

4. Apparatus of the character described comprising in combination a reaction chamber, an inlet for the reaction chamber, means for forming a suspension of finely divided material in an oxidizing gas, means for introducing the gaseous suspension into the reaction chamber through the inlet, and means associated with the inlet for maintaining a fluid protective layer between the walls of the reaction chamber and the gaseous suspension therein.

5. Apparatus of the character described comprising a reaction chamber, an inlet at the upper end of the reaction chamber, means for forming a suspension of finely divided material in an oxidizing gas, means for introducing the suspension into the reaction chamber through the inlet, and means for maintaining a portion of the said gas between the walls of the reaction chamber and the gaseous suspension therein.

6. Apparatus of the character described comprising a reaction chamber, an inlet for the reaction chamber, means for forming a suspension of finely divided material in an oxidizing gas, means for introducing the gaseous suspension into the reaction chamber through the inlet, and means associated with the inlet for maintaining a portion of the said gas between the walls of the reaction chamber and the gaseous suspension therein.

7. An ore roasting furnace comprising a roasting chamber, means for forming a suspension of finely divided ore in an oxidizing gas in the roasting chamber, and means for maintaining a fluid protective layer between the walls of the roasting chamber and the gaseous suspension therein.

8. An ore roasting furnace comprising a roasting chamber, means for forming a suspension of finely divided ore in an oxidizing gas in the roasting chamber, and means for maintaining a portion of the said gas between the walls of the roasting chamber and the gaseous suspension therein.

9. In an apparatus of the character described having a reaction chamber, feeding means comprising a conduit, means associated with the conduit for forming a suspension of finely divided material in an oxidizing gas, means for introducing the suspension into the reaction chamber, a gas inlet chamber, means for introducing a gas into the reaction chamber through the inlet chamber, and means associated with the inlet chamber for forming and maintaining a layer of gas between the walls of the reaction chamber and the gaseous suspension therein.

10. In an apparatus of the character described having a reaction chamber, feeding means comprising a conduit, means for forming a suspension of finely divided material in an oxidizing gas in the conduit, means for introducing the suspension into the reaction chamber, a gas inlet chamber, means for introducing a gas into the reaction chamber through the inlet chamber, and a deflecting member associated with the inlet chamber for forming and maintaining a layer of gas between the walls of the reaction chamber and the gaseous suspension therein.

11. In an apparatus of the character described having a reaction chamber, feeding means comprising a conduit, means associated with the conduit for forming a suspension of finely divided material in an oxidizing gas, means for introducing the suspension into the reaction chamber, a gas inlet chamber surrounding the conduit, means for introducing a gas into the reaction chamber through the inlet chamber, and means positioned in the inlet chamber adjacent the reaction chamber for forming and maintaining a layer of gas between the walls of the reaction chamber and the gaseous suspension therein.

12. In an apparatus of the character described having a reaction chamber, feeding means comprising a conduit, means associated with the conduit for forming a suspension of finely divided material in an oxidizing gas, means for introducing the suspension into the reaction chamber, a gas inlet chamber, means for introducing a gas into the reaction chamber through the inlet chamber, and adjustable means associated with the inlet chamber for forming and maintaining a layer of gas between the walls of the reaction chamber and the gaseous suspension therein.

13. In an apparatus of the character described having a reaction chamber, feeding means comprising a conduit, means associated with the conduit for forming a suspension of finely divided material in an oxidizing gas, means for introducing the suspension into the reaction chamber, a gas inlet chamber surrounding the conduit, means for introducing a gas into the reaction chamber through the inlet chamber, and an adjustable member associated with the inlet chamber and comprising a part of said conduit for forming and maintaining a layer of gas between the walls of the reaction chamber and the gaseous suspension therein.

14. In an apparatus of the character described having a reaction chamber, feeding means comprising a casing, a conduit within the casing, means for forming a suspension of finely divided material in an oxidizing gas in the conduit, means for introducing the suspension into the reaction chamber, a gas inlet chamber formed between the casing and the conduit, means for introducing a gas into the reaction chamber through the inlet chamber, and a member forming a part of and adjustable longitudinally of the conduit for forming and maintaining a layer of gas between the walls of the reaction chamber and the gaseous suspension therein.

15. In an apparatus of the character described having a reaction chamber, feeding means comprising a casing, a conduit within the casing, means for forming a suspension of finely divided material in an oxidizing gas in the conduit, means for introducing the suspension into the reaction chamber, a gas inlet chamber formed between the casing and the conduit, means for introducing a gas into the reaction chamber through the inlet chamber, and an annular flange attached to the conduit and adjustable longitudinally of the conduit for forming and maintaining a layer of gas between the walls of the reaction chamber and the gaseous suspension therein.

16. In an apparatus of the character described having a reaction chamber, feeding means comprising a casing, a conduit within the casing, means for forming a mixture of finely divided material in an oxidizing gas in the conduit, a gas inlet chamber between the casing and the conduit terminating in a gas passage at one end of the casing, and means associated with the said passage for deflecting the gas passing therethrough at an angle away from the axis of the conduit.

17. In an apparatus of the character described having a reaction chamber, feeding means comprising a casing, a conduit within the casing, means for forming a mixture of finely divided material in an oxidizing gas in the conduit, a gas inlet chamber between the casing and the conduit terminating in a gas passage at one end of the casing, means for admitting gas from the gas inlet chamber into the conduit and creating a turbulent action therein, a flange formed on the conduit adjacent the said end of the casing, and means for adjusting the flange axially of the conduit.

18. In an apparatus of the character described having a reaction chamber, feeding means comprising a casing, a sectional conduit within the casing, means for forming a mixture of finely divided material in an oxidizing gas in the conduit, a gas inlet chamber between the casing and the conduit terminating in a gas passage at one end of the casing, a flange formed on one section of the conduit adjacent the said end of the casing, and means for adjusting the said section axially of the conduit.

19. In an apparatus of the character described having a reaction chamber, feeding means comprising a casing, a sectional conduit within the casing, means for forming a mixture of finely divided material in an oxidizing gas in the conduit, a gas inlet chamber between the casing and the conduit terminating in a gas passage at one end of the casing, means for admitting gas from the gas inlet chamber into the conduit and creating a turbulent action therein, a flange formed on the end of one section of the conduit adjacent the said end of the casing and means for adjusting the said section axially of the conduit.

20. In an apparatus of the character described having a reaction chamber, feeding means comprising a casing, a cylindrical conduit within the casing including a fixed section and a movable section, the movable section having a larger diameter than the fixed section and arranged with respect to the fixed section so as to form an annular passage for the admission of gas to the interior of the conduit, a gas inlet chamber between the casing and the conduit terminating in a gas passage at one end of the casing, means for feeding finely divided material into the conduit, means for admitting gas from the gas inlet chamber to the conduit and creating a turbulent action therein and a flange formed on one end of the movable section adjacent the said end of the casing.

21. In an apparatus of the character described having a reaction chamber, feeding means comprising a casing, a cylindrical conduit within the casing including a fixed section and a movable section, the movable section being constructed so as to have a sliding fit over the adjacent end of the fixed section, a gas inlet chamber between the casing and the conduit terminating in a gas passage at one end of the casing, means for feeding a mixture of finely divided material and an oxidizing gas into one end of the fixed section of the conduit, means for admitting gas from the gas inlet chamber tangentially into the conduit and creating a turbulent action therein, and a flange formed on one end of the movable section adjacent the said end of the casing.

22. In an apparatus of the character described having a reaction chamber, feeding means comprising a casing, a cylindrical conduit within the casing including a fixed section and a movable section, the movable section being constructed so as to have a sliding fit over the adjacent end of the fixed section, a gas inlet chamber between the casing and the conduit terminating in a gas passage at one end of the casing, means for feeding a mixture of finely divided material and an oxidizing gas into one end of the fixed section of the conduit, openings in the movable section for admitting gas from the gas inlet chamber to the conduit, means for regulating the number of said openings, and a flange formed on one end of the movable section adjacent the said end of the casing.

23. In an apparatus of the character described having a reaction chamber, feeding means for the reaction chamber comprising a casing, a conduit in the casing, a gas inlet chamber between the conduit and the casing communicating with the reaction chamber, means for forming a mixture of finely divided material in an oxidizing gas in the conduit and means for admitting a portion of the gas from the gas inlet chamber into the conduit.

24. In an apparatus of the character described, feeding means comprising a casing, a conduit in the casing, a gas inlet chamber between the conduit and the casing, means for introducing a mixture of finely divided material in an oxidizing gas into one end of the conduit, and means for admitting gas from the gas inlet chamber into the conduit.

25. Apparatus of the character described comprising a reaction chamber, means for forming a mixture of finely divided material in a primary volume of oxidizing gas, means for adding to the mixture a secondary volume of oxidizing gas and forming a complete suspension of said material in the oxidizing gas, means for introducing the gaseous suspension into the reaction chamber, and means for maintaining a layer of gas between the walls of the reaction chamber and the gaseous suspension therein.

26. In an apparatus of the character described a feed mechanism comprising a feed conduit, means for introducing finely divided material into one end of the conduit, a shaft rotatably mounted in the conduit, a helicoid conveyor on the shaft terminating short of the discharge end of the conduit, a pair of blade propellers fixed on the shaft between the end of the conveyor and the discharge end of the conduit, the propeller adjacent the end of the conduit having the greater number of blades.

27. A furnace for burning sulfur bearing ore to produce sulfur dioxide for sulfuric acid manufacture comprising a combustion chamber, means for introducing a spray of sulfur bearing ore fines into said combustion chamber, means for heating an oxidizing medium to relatively high temperatures, and means for introducing the said heated oxidizing medium into co-mixing relation with said spray for combustion of said spray and for the production of sulfur dioxide gases.

28. A furnace for burning sulfur bearing ore to produce sulfur dioxide for sulfuric acid manufacture comprising a combustion chamber, means for continuously feeding a stream of sulfur bearing ore fines into said combustion chamber, means for injecting an oxidizing medium directly into said ore stream, and means for introducing additional oxidizing medium into said chamber in a stream surrounding said ore stream.

29. A furnace for burning sulfur bearing ore to produce sulfur dioxide for sulfuric acid manufacture comprising a combustion chamber, means for continuously feeding a spray of sulfur bearing ore fines into said combustion chamber, means for injecting an air stream directly into said ore spray, means for introducing additional air into said chamber in a stream surrounding said ore spray, and means for preheating said air streams to relatively high temperatures.

30. A furnace for burning sulfur bearing ore to produce sulfur dioxide for sulfuric acid manufacture comprising a vertically elongated combustion chamber including top, intermediate, and bottom portions, a spray nozzle arranged at the top portion of said combustion chamber, means for feeding a stream of sulfur bearing ore fines into said spray nozzle and producing a spray of said ore fines, means for intermixing a heated oxidizing medium with said stream of ore fines for combustion of said spray and for the production of sulfur dioxide gases, means at the intermediate portion of said combustion chamber defining an exit for the combustion gases, and the bottom portion of said combustion chamber being arranged for collecting and discharging the ore cinders.

31. A furnace for burning sulfur bearing ore to produce sulfur dioxide for sulfuric acid manufacture comprising a vertically elongated combustion chamber including top, intermediate, and bottom portions, a spray nozzle arranged at the top portion of said combustion chamber, means for feeding a stream of sulfur bearing ore fines into said spray nozzle and producing a spray of said ore fines, means for feeding a stream of air with said stream of ore fines for combustion of said spray in order to produce sulfur dioxide gases, means at the intermediate portion of said combustion chamber defining an exit for the desired combustion gases, the bottom portion of said combustion chamber being arranged for collecting and discharging the ore cinders and impurities remaining after the combustion of the sulfur.

32. A furnace for burning sulfur bearing ore to produce sulfur dioxide for sulfuric acid manufacture, comprising a vertically disposed greatly elongated combustion chamber including top, intermediate, and bottom portions, means at the top portion of said combustion chamber for feeding sulfur bearing ore fines into said combustion chamber, means for introducing a stream of an oxidizing medium into said chamber for combustion of said ore and for the production of sulfur dioxide gases, an exit duct for the combustion gases at the intermediate portion of the chamber, the bottom portion of said chamber being shaped to act as a hopper for the collection and discharge of ore cinders.

WILLIAM JOHN BURGOYNE.
HENRY JOHN CORDY.